United States Patent
Jeong et al.

(10) Patent No.: US 9,420,357 B2
(45) Date of Patent: Aug. 16, 2016

(54) METHOD AND APPARATUS FOR SELECTING WAVELENGTH BY WAVELENGTH TUNABLE OPTICAL RECEIVER

(71) Applicant: ELECTRONICS AND TELECOMMUNICATIONS RESEARCH INSTITUTE, Daejeon (KR)

(72) Inventors: Jong Sool Jeong, Daejeon (KR); Dong Hun Lee, Daejeon (KR); Mi Ran Park, Daejeon (KR); Byung Seok Choi, Daejeon (KR); Hyun Soo Kim, Daejeon (KR); O Kyun Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/619,124

(22) Filed: Feb. 11, 2015

(65) Prior Publication Data

US 2015/0236797 A1     Aug. 20, 2015

(30) Foreign Application Priority Data

Feb. 14, 2014   (KR) ........................ 10-2014-0017252

(51) Int. Cl.
| | |
|---|---|
| H04B 10/06 | (2006.01) |
| H04Q 11/00 | (2006.01) |
| H04B 10/67 | (2013.01) |
| H04J 14/02 | (2006.01) |

(52) U.S. Cl.
CPC ......... H04Q 11/0005 (2013.01); H04B 10/675 (2013.01); H04J 14/0276 (2013.01); H04B 2210/075 (2013.01); H04Q 2011/0009 (2013.01); H04Q 2011/0018 (2013.01)

(58) Field of Classification Search
CPC .. H04B 10/671; H04B 10/675; H04B 10/697; H04B 10/60; H04B 10/40; H04B 10/0795; H04B 10/077; H04B 10/07955; H04B 10/0258; H04J 14/0246; H04J 14/025

USPC ......... 398/202, 208, 209, 210, 212, 213, 214, 398/135, 136, 33, 38, 158, 159, 30, 31, 32, 398/79, 85

See application file for complete search history.

(56) References Cited

U.S. PATENT DOCUMENTS 6,043,922 A * 3/2000 Koga .................. H04B 10/675
                                               359/199.1

(Continued)

FOREIGN PATENT DOCUMENTS

| KR | 10-2006-0065056 A | 6/2006 |
| KR | 10-2007-0059895 A | 6/2007 |

OTHER PUBLICATIONS

Yuanqiu Luo et al., "Time- and Wavelength-Division Multiplexed Passive Optical Network (TWDM-PON) for Next-Generation PON Stage 2 (NG-PON2)", Journal of Lightwave Technology, vol. 31, No. 4, pp. 587-593, Feb. 15, 2013.

(Continued)

*Primary Examiner* — Hanh Phan
(74) *Attorney, Agent, or Firm* — Rabin & Berdo, P.C.

(57) ABSTRACT

Disclosed are a method and an apparatus for selecting a wavelength by a wavelength tunable optical receiver. The method of selecting a wavelength of a wavelength tunable optical receiver includes: receiving, by the wavelength tunable optical receiver, an optical signal from a wavelength tunable optical transmitter; filtering, by the wavelength tunable optical receiver, the optical signal through a low frequency band electrical signal filter, and obtaining a low frequency signal; determining, by the wavelength tunable optical receiver, whether the low frequency signal is a valid signal based on a current value of the low frequency signal; and when the low frequency signal is the valid signal, obtaining, by the wavelength tunable optical receiver, an enable condition of a wavelength tunable optical filter through which the low frequency signal is selected, in which the low frequency signal includes a control/monitoring signal.

10 Claims, 4 Drawing Sheets

(56) References Cited

U.S. PATENT DOCUMENTS

2012/0328287 A1   12/2012   Grosso
2015/0155934 A1*   6/2015   Nakagawa ......... H04B 10/0775
                                                             398/34

OTHER PUBLICATIONS

Yuanqiu Luo et al., "Wavelength Management in Time and Wavelength Division Multiplexed Passive Optical Networks (TWDM-PONs)", Globecom 2012—Optical Networks and Systems Symposium, pp. 2971-2976, Dec. 3-7, 2012.

* cited by examiner

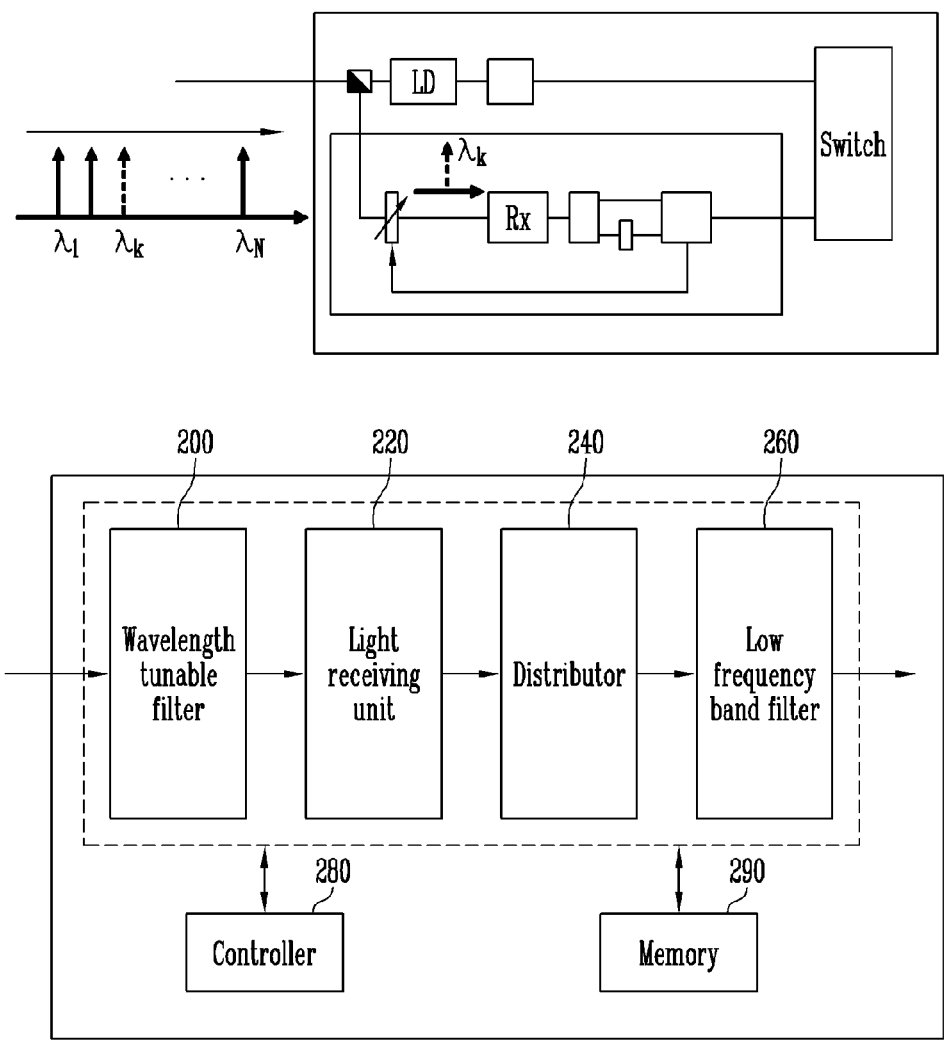

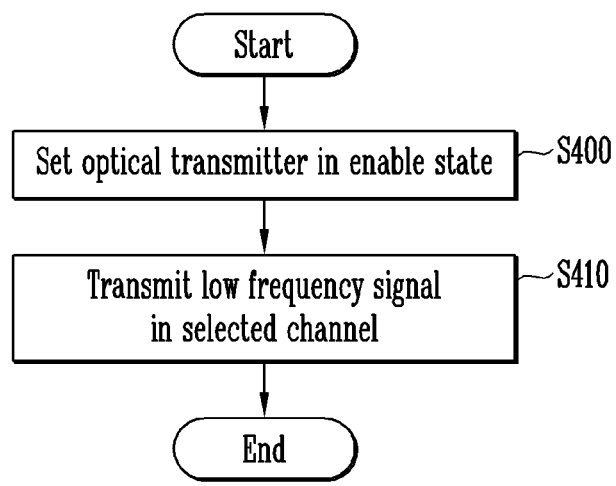
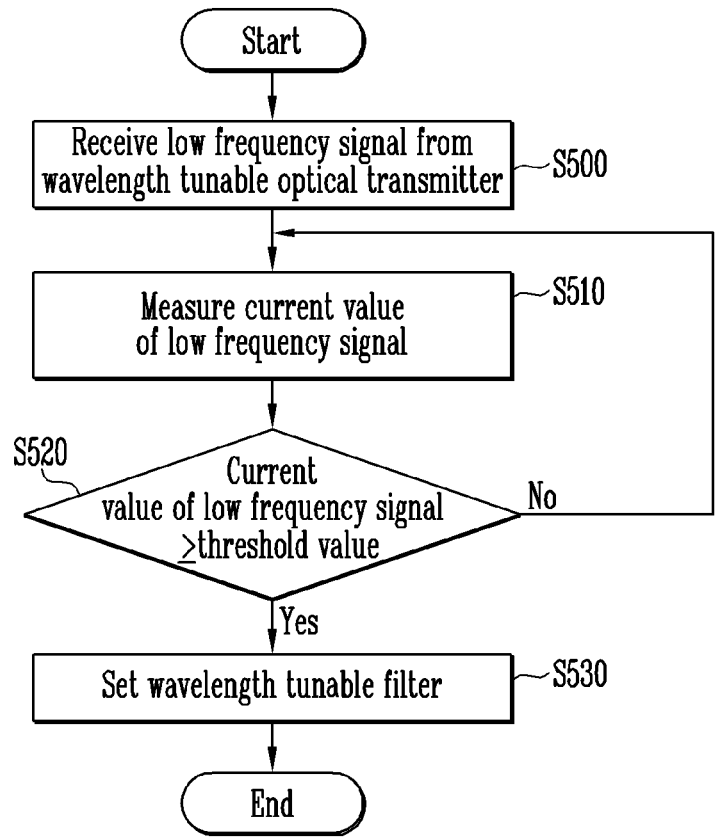

METHOD AND APPARATUS FOR SELECTING WAVELENGTH BY WAVELENGTH TUNABLE OPTICAL RECEIVER

CROSS-REFERENCE TO RELATED APPLICATION

This application is based on and claims priority from Korean Patent Application No. 10-2014-0017252, filed on Feb. 14, 2014, with the Korean Intellectual Property Office, the disclosure of which is incorporated herein in its entirety by reference.

BACKGROUND

1. Field

The present invention relates to an optical receiver, and more particularly, to a wavelength tunable optical receiver.

2. Discussion of Related Art

Optical communication refers to transmission and exchange of information by using a wavelength of light. A wavelength band usable by the optical communication depends on a light source, but is mostly limited to an infrared ray wavelength band.

Communication using an optical cable is similar to wired communication in the related art in that an optical fiber, which is a transmission medium, is used, but is similar to wireless communication in the related art in that a signal is transmitted by using light, which is a carrier wave.

Optical communication system is divided into an optical transmission apparatus and an optical communication apparatus. The optical transmission apparatus may pass through a step of a signal, optical modulation, optical amplification, optical multification, optical detection, and a signal. The optical communication apparatus is divided into an optical distribution device and an optical switching device. A basic factor of optical transmission includes a light emitting device, light receiving device, and an optical fiber.

As a light source of the optical communication transmission device, a Light Emitting Diode and a light Amplification by Stimulated Emission of Radiation (LASER) may be mainly used. The LED has a lower output and a wider wavelength width than those of the LASER, so that the LED is usable in short range communication that is low-speed modulation.

The light receiving device has a function opposite to that of a light source that is an optical device, so that the light receiving device serves to receive an optical signal and change the received optical signal to an electrical signal within a receiver. As the light receiving device used in the optical communication, a PIN Photo Diode (PD), an Avalanche Photo Diode (APD), and the like are usable.

Since a PIN optical diode light receiving device has a wide intrinsic layer, which has the simplest structure and is capable of much absorbing a photon of entering light, in a PN junction of a semiconductor, so that a fast response rate may be recorded by a high current from the outside, there may be no amplification, and efficiency may be highly improved.

SUMMARY

The present invention has been made in an effort to provide a method of selecting a wavelength by a wavelength tunable optical receiver.

Further, the present invention has been made in an effort to provide an apparatus for performing a method of selecting a wavelength by a wavelength tunable optical receiver.

An exemplary embodiment of the present invention provides a method of selecting a wavelength of a wavelength tunable optical receiver, including: receiving, by the wavelength tunable optical receiver, an optical signal from a wavelength tunable optical transmitter; filtering, by the wavelength tunable optical receiver, the optical signal through a low frequency band electrical signal filter, and obtaining a low frequency signal; determining, by the wavelength tunable optical receiver, whether the low frequency signal is a valid signal based on a current value of the low frequency signal; and when the low frequency signal is the valid signal, obtaining, by the wavelength tunable optical receiver, an enable condition of a wavelength tunable optical filter through which the low frequency signal is selected, in which the low frequency signal includes a control/monitoring signal. The method may further include storing, by the wavelength tunable optical receiver, the enable condition of the wavelength tunable optical filter, and the current value of the low frequency signal. The wavelength tunable optical transmitter may select one or more channels, though which the low frequency signal is to be transmitted, among all of the available channels, and transmit the low frequency signal through the one or more selected channels. The wavelength tunable optical transmitter may set the channel, through which the low frequency signal is to be transmitted, to an enable mode, and remaining channels except for the channel, through which the low frequency signal is to be transmitted, to a disable mode. The determining whether the low frequency signal is the valid signal based on the current value of the low frequency signal may further include determining that the low frequency signal is the valid signal when the current value of the low frequency signal is larger than the threshold value.

Another exemplary embodiment of the present invention provides a wavelength tunable optical receiver performing selection of a wavelength, including: an optical receiving unit configured to receive an optical signal from a wavelength tunable optical transmitter; a low frequency band electrical signal filter unit configured to filter the optical signal and obtain a low frequency signal; a valid signal determination unit configured to determine whether the low frequency signal is a valid signal based on a current value of the low frequency signal; and a filter setting unit configured to obtain an enable condition of a wavelength tunable optical filter, through which the low frequency signal is selected, when the low frequency signal is the valid signal, in which the low frequency signal includes a control/monitoring signal. The wavelength tunable optical receiver may further include a memory configured to store the enable condition of the wavelength tunable optical filter, and the current value of the low frequency signal. The wavelength tunable optical transmitter may select one or more channels, though which the low frequency signal is to be transmitted, among all of the available channels, and transmit the low frequency signal through the one or more selected channels. The wavelength tunable optical transmitter may set the channel, through which the low frequency signal is to be transmitted, to an enable mode, and remaining channels except for the channel, through which the low frequency signal is to be transmitted, to a disable mode. The valid signal determination unit may determine that the low frequency signal is the valid signal when the current value of the low frequency signal is larger than the threshold value.

As described above, according to the exemplary embodiments of the present invention, the method and the apparatus for selecting a wavelength by the wavelength tunable optical receiver may efficiently select an optical signal wavelength by the wavelength tunable optical receiver, thereby achieving simplification, miniaturization, and low-price of a wavelength selection device. Further, a wavelength selection algorithm of an optical receiver is sequentially and periodically performed for a plurality of ONUs, thereby preventing performance deterioration due to an aging effect of the wavelength tunable optical filter, and thus guaranteeing high quality Wavelength Division Multiplexing (WDM) optical signal transmission.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which:

FIG. 3 is a conceptual diagram illustrating a wavelength tunable optical receiver including a wavelength selecting device according to the exemplary embodiment of the present invention;

FIG. 4 is a flowchart illustrating a method of selecting a wavelength by a wavelength tunable optical transmitter according to the exemplary embodiment of the present invention;

FIG. 5 is a flowchart illustrating a method of selecting a wavelength by a wavelength tunable optical receiver according to the exemplary embodiment of the present invention.

DETAILED DESCRIPTION

Figure 1:
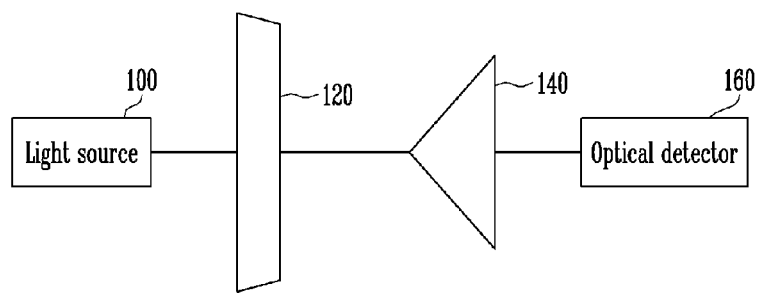
FIG. 1 is a conceptual diagram illustrating a basic WDM based optical network.

The present invention may be variously modified and have various exemplary embodiments, so that specific embodiments will be illustrated in the drawings and described in the detailed description. However, it is not intended to limit the present invention to the specific embodiments, and it will be appreciated that the present invention includes all modifications, equivalences, or substitutions included in the spirit and the technical scope of the present invention. In the description of respective drawings, similar reference numerals designate similar elements.

Terms "first", "second", "A", "B", and the like may be used for describing various constituent elements, but the constituent elements should not be limited to the terms. The terms are used only to discriminate one constituent element from another constituent element. For example, a first element could be termed a second element, and similarly, a second element could be also termed a first element without departing from the scope of the present disclosure. A term "and/or" includes a combination of multiple relevant described items or any one of the multiple relevant described items.

In the case where a component is referred to as being "connected" or "accessed" to other component, it should be understood that the component may not only be directly connected or accessed to the other component, but also there may exist another component between them. In contrast, when one constituent element is "directly coupled to" or "directly connected to" another constituent element, it should be understood that there are no intervening element present.

Terms used in the present application are used only to describe specific exemplary embodiments, and are not intended to limit the present invention. As used herein, the singular forms are intended to include the plural forms as well, unless the context clearly indicates otherwise. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other specific characteristics, numbers, steps, operations, constituent elements, and components, or a combination thereof in advance.

Hereinafter, an exemplary embodiment of the present invention will be described in detail with reference to the accompanying drawings. Hereinafter, like reference numerals refer to like elements, and overlapping descriptions of the same element will be omitted.

In an optical communication network adopting a time division/wavelength division-hybrid method, a plurality of optical signals having different wavelengths may be transmitted through one optical fiber. An optical subscriber terminal located at a remote place may communicate with a central office by automatically selecting an optical signal wavelength corresponding to each optical subscriber terminal. The optical communication network adopting a time division/wavelength division-hybrid method may include an Optical Line Terminal (OLT) and an Optical Network Units (ONUs) located at a Central Office (OC), and an optical distribution network connecting the OLT and the ONUs.

A structure widely used in the various optical distribution networks is a forming structure of installing a Remote Node (RN) formed of an optical power distributor in an adjacent region of optical subscribers, connecting the OLT and the RN with a single optical fiber, and then connecting the RN and the ONUs with the optical fiber.

Currently, the generally known optical communication network adopting a time division/wavelength division-hybrid method may perform communication by using different wavelength bands by separating wavelengths of an uplink signal and a downlink signal. In the wavelength-band separation type optical communication network, a wavelength multiplexer may be disposed in a transmitter of the OLT, a wavelength division demultiplexer is disposed in a receiver, the OLT and the RN are connected through the single optical fiber, and then each port of the RN and the ONU may be connected through the forming structure.

An optical transceiver used in the ONU may include an optical filter for the wavelength-band separation, an optical transmitter, and an optical receiver. As a wavelength-separation band is narrow in the optical transceiver, it is technically difficult to implement the optical fiber for the wavelength-band separation. Accordingly, a method of dividing the OLT-wavelength multiplexer/demultiplexer into a wavelength multiplexer for wavelength-multiplexing a downlink WDM optical signal and a wavelength demultiplexer for wavelength-demultiplexing an uplink WDM optical signal when the uplink WDM optical signal is used as a C-band wavelength band, and the down WDM optical signal is used as an L-band wavelength band has been widely used.

In the existing time division/wavelength division-hybrid optical communication network structure, as a method of selecting an optical signal wavelength of the ONU optical receiver, a method using a higher layer equal to or higher than a data-link layer may be used, but a physical layer may not be used. Accordingly, there is a problem in that a system overhead and complexity for the wavelength selection of the optical receiver are increased, and costs and time are increased.

Hereinafter, in order to solve the aforementioned problem, an exemplary embodiment of the present invention discloses a wavelength selecting device of a wavelength tunable optical receiver. The present invention discloses a method by which a structure of the wavelength selecting device is simply implemented, additional cost is minimized, and performance is prevented from deteriorating due to aging effect.

FIG. 1 is a conceptual diagram illustrating a basic WDM based optical network.

Referring to FIG. 1, an optical device configuring a WDM based optical network may be generally divided into a light source 100, an optical detector 160, an optical multiplexer 120, and an power splitter 140.

As the optical source 100, which is a light source of an optical communication transmission device, a Light Emitting Diode (LED) and a Light Amplification by Stimulated Emission of Radiation (LASER) may be mainly used. The LED has a lower output and a wider wavelength width than those of the LASER, so that the LED is usable in short range communication that is low-speed modulation.

The LASER has an optical cavity of a reflector unlikely to the LED, and confined photons continuously receive reflective stimulation by a high current and emit light, so that light is spread at the same phase only in one direction without spread of light in a single wavelength band. Accordingly, deformation of a signal is little, so that the LASER is used as a light source for high-speed transmission of 1 Gbps or larger together with a single mode and an optical fiber.

In general, a condition of selecting a light source may include an output, efficiency, magnitude, life, modulation, a working temperature, a price, and reliability of light, and the LASER has lower reliability and shorter life than those of the LED, so that the LASER is not appropriate as a light source of a long range communication network. However, a laser having long life equivalent to that of the LED and a laser of Distributed Feedback (DBR) for an ocean floor cable have been recently developed, so that high speed transmission of 20 Gbps may be achieved in a long wavelength (1.5 μm).

The optical detector 160 serves to receive an optical signal and change the received the optical signal to an electrical signal within a receiver. In a light receiving device used in optical communication, a PIN optical diode and an Avalanche Photo Diode (APD) are widely used.

Since a PIN optical diode light receiving device has a wide intrinsic layer, which has a simple structure and is capable of much absorbing a photon of entering light, in a PN junction of a semiconductor, thereby having a fast response rate by a high current from the outside, having no amplification, and having improved efficiency.

Unlikely to the PIN optical diode, in an APD light receiving device, when electrons are accelerated and collide with each other by kinetic energy at a high state and free electrons are secondarily generated, injected primary photons are geometrically diffused or amplified like a phenomenon, such as an avalanche. Reactivity of the APD light receiving device is amplified by 100 times or more than that of the PIN optical diode, but the APD light receiving device is sensitive to a change in a temperature, a complicated structure, and a high price. However, the APD light receiving device may be essential in a high-speed or long range communication network together with the LASER. As a characteristic of the light receiving device, a bias voltage, a reaction rate, a time, quantum efficiency, that is, a ratio of generated electrons to absorbed photons, are important variables.

The optical multiplexer 120 simultaneously transmits optical wavelengths which are incident through several optical fibers, respectively, through one optical fiber for the same device. The optical multiplexer 120 may include an Arrayed Wave Guide Grating (AWG) type, a thin film type, and a diffraction grating type.

In the AWG type, optical waveguides having different optical paths may be formed on a silicon substrate, and waveguides connectable with optical fibers, and slab waveguides connecting the waveguides may be formed at both ends of the silicon substrate.

The power splitter(140) is an optical component in which power is split based on the wavelength composition of the optical signal. The power splitter(140) splits optical signal entering through one optical fiber into respective optical fibers.

Figure 2:
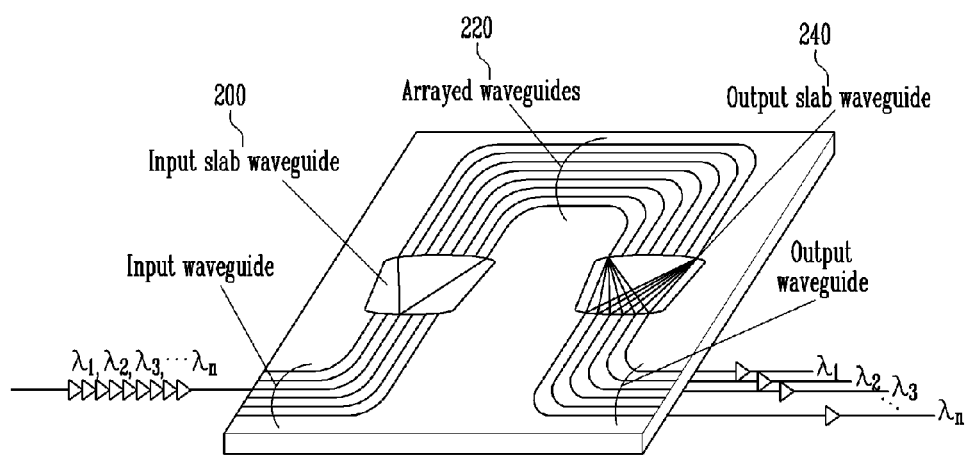
FIG. 2 is a conceptual diagram illustrating an optical demultiplexing operation of an AWG.

FIG. 2 is a conceptual diagram illustrating an optical demultiplexing operation of the AWG.

Referring to FIG. 2, when a plurality of optical wavelengths are incident through an arbitrary one port of the AWG, passes through the waveguide, and then passes through an input slap waveguide 200, the plurality of wavelengths are spread and passes by each waveguide of an arrayed waveguide 220. The wavelengths passing by the respective arrayed waveguides 220 have a different path difference, and are combined again by constructive interference in a specific output waveguide while passing by an output slap waveguide 240, so that only one wavelength is emitted.

By the same principle, different wavelengths are sent out through different output waveguides. The AWG type is manufactured through a process, such as a semiconductor manufacturing process on a silicon substrate, so that the AWG type is a structure advantageous to mass production.

FIG. 3 is a conceptual diagram illustrating a wavelength tunable optical receiver including a wavelength selecting device according to an exemplary embodiment of the present invention.

Referring to FIG. 3, the wavelength tunable optical receiver including the wavelength selecting device may include a wavelength tunable optical filter 200, a light receiving unit 220, a distributor 240, a low-frequency band filter 260, and a controller 280.

The wavelength tunable optical filter 200 may be implemented so as to allow an optical signal in a specific wavelength band to selectively pass through. A wavelength multiplexed optical signal sequentially passes through the wavelength tunable optical filter 200, so that the wavelength tunable optical filter 200 may adopt a wavelength selection algorithm for selecting an optical signal of a specific wavelength.

The wavelength selection algorithm may be performed based on a low frequency signal included in a wavelength multiplexed optical signal transmitted to the wavelength tunable optical receiver. For example, a low frequency signal of about 1 kHz for control and monitoring may be added to an optical signal of a specific wavelength to be transmitted. The wavelength selection algorithm may be performed based on the received low frequency signal. The wavelength tunable optical receiver may detect a low frequency signal of a channel corresponding to a wavelength band desired to be selected.

The wavelength selecting method may continuously and automatically update a wavelength selection condition of the optical receiver during an operation of the wavelength tunable optical transmitter, so that the wavelength selecting method may effectively handle a change in a characteristic of the wavelength tunable optical receiver by an aging effect generable during a long-term operation.

The optical signal of the low frequency band transmitted to the receiving unit 220 of the wavelength tunable optical receiver may be converted to an electrical signal, and then filtered by a low frequency band electrical filter unit 260 and detected. Accordingly, it is possible to detect a wavelength of an optical signal desired to be selected regardless of an optical signal of another channel. An enable condition of the wavelength tunable optical filter, a current value of the light receiving unit, and the like may be stored in a form, such as a lookup table, in a memory 290.

The light receiving unit 220 may be implemented in order to convert the received optical signal to an electrical signal.

The distributor 240 may be implemented in order to distribute an intensity of the electrical signal.

The low frequency band filter unit 260 may be implemented in order to detect an electrical signal for low frequency band control/monitoring.

The controller 280 may be implemented in order to control the wavelength tunable optical filter.

According to the exemplary embodiment of the present invention, it is possible to select a wavelength of an optical signal in a physical layer without using a high layer equal to or higher than a data-link layer by using the wavelength selection algorithm based on a low frequency signal. It is possible to decrease an overhead and complexity of a system for the wavelength selection, and minimize implementation cost by selecting a wavelength of an optical signal in a physical layer. Further, it is possible to solve performance deterioration by an aging effect generated during the long-term operation, thereby inducing simplification, miniaturization, and low-price of the time division/wavelength division-hybrid optical communication system structure.

FIG. 4 is a flowchart illustrating a method of selecting a wavelength by the wavelength tunable optical transmitter according to the exemplary embodiment of the present invention.

FIG. 4 discloses an operation of the wavelength tunable optical transmitter for performing the aforementioned wavelength selection algorithm based on the low frequency signal.

Referring to FIG. 4, optical transmitters of all of the channels are set to be in an enabling state (step S400).

In order to perform the wavelength selection algorithm, a low frequency module for an optical transmitter of a specific channel may be enabled after setting the optical transmitters of all of the channels to be in the enabling state.

A channel, through which a low frequency signal is to be transmitted, is selected, and the low frequency signal is transmitted in the selected channel (step S410).

In step S410, the low frequency signal may be generated in a corresponding channel by setting only a low frequency enabling module of the optical transmitter to be in an enable mode channel K desired to be controlled. For the channel not-performing the control, all of the optical transmitter low frequency driving modules are set to be in a disable mode, so that a low frequency signal for the control may not be generated.

The low frequency signal is added in the selected channel, so that a low frequency band control/monitoring signal may be added only to an optical signal of a specific wavelength desired to be detected in a wavelength multiplexed WDM optical signal. In the wavelength tunable optical receiver, an enable condition of the wavelength tunable optical filter, through which the optical signal including the added control/monitoring signal is selected through an electrical filter of a low frequency band, may be found. The obtained driving condition of the wavelength tunable optical filer of the wavelength tunable optical receiver, a current value of a low frequency electrical signal, and the like may be stored in the lookup table.

FIG. 5 is a flowchart illustrating a method of selecting a wavelength by the wavelength tunable optical receiver according to the exemplary embodiment of the present invention.

FIG. 5 illustrates the wavelength selection algorithm performed by the wavelength tunable optical receiver based on the low frequency signal in detail.

The wavelength selection algorithm according to the exemplary embodiment of the present invention is an algorithm of continuously and automatically updating the enable condition of the wavelength tunable optical filter during the operation by using a low frequency signal of about 1 kHz. When the wavelength selection algorithm is used, it is possible to effectively handle a change in a characteristic of a wavelength tunable filter by an aging effect generable during a long-term operation of the wavelength tunable optical receiver.

Referring to FIG. 5, a low frequency signal is received from the wavelength tunable optical transmitter (step S500).

The wavelength tunable optical receiver may receive the low frequency signal from the wavelength tunable optical transmitter. As described above, the wavelength tunable optical transmitter may select a channel, through which the low frequency signal is to be transmitted, and transmit the low frequency signal through the selected channel. The low frequency signal may include a control/monitoring signal. The wavelength tunable optical receiver may receive the low frequency signal by controlling the wavelength tunable filter.

A current value of the received low frequency signal is measured (step S510).

The wavelength tunable optical receiver may determine whether the received low frequency signal is a valid signal by measuring the current value of the received low frequency signal.

Whether the current value of the low frequency signal is equal to or larger than a threshold value (step S520).

Whether the received low frequency signal is the valid signal may be determined by determining whether the current value of the low frequency signal is equal to or larger than the threshold value.

When the current value of the low frequency signal is smaller than the threshold value, it may be determined that the received low frequency signal is not the valid signal, and control the wavelength tunable filter of the wavelength tunable optical receiver again.

On the contrary, when the current value of the low frequency signal is equal to or larger than the threshold value, it may be determined that the received low frequency signal is the valid signal.

The threshold value may be the maximum value of the current value of the low frequency signal.

When the received low frequency signal is the valid signal, the wavelength tunable filter is set (step S530).

When the current value of the low frequency signal is equal to or larger than the threshold value, so that it is determined that the received low frequency signal is the valid signal, the wavelength tunable optical receiver may set the wavelength tunable filter for k channels, through which the low frequency signal is transmitted, based on the control/monitoring signal included in the low frequency signal. Further, an enable condition of the wavelength tunable optical filter, in which the optical signal including the added control/monitoring signal is selected, and a PD value may be measured. Further, the enable condition of the wavelength tunable optical filter and a current value of the low frequency electrical signal of the wavelength tunable optical receiver may be stored by using a method, such as a lookup table.

Figure 6:
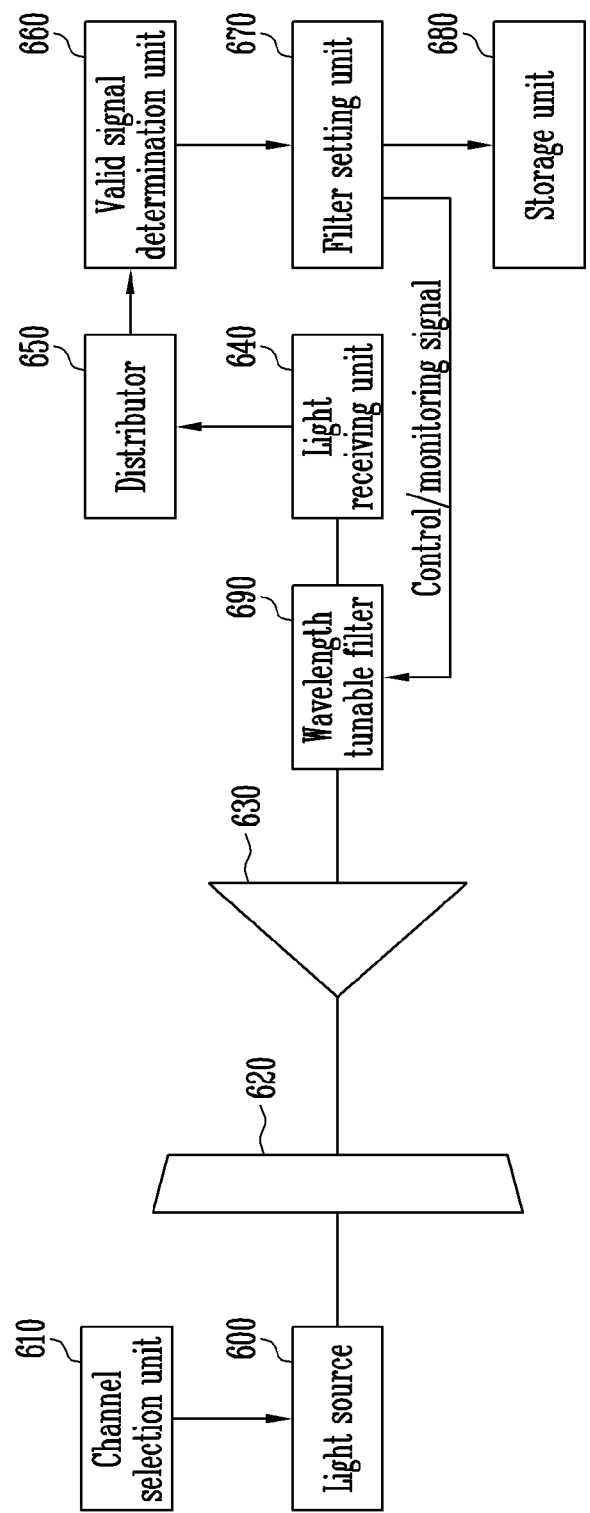
FIG. 6 is a conceptual diagram illustrating an optical communication network according to the exemplary embodiment of the present invention.

FIG. 6 is a conceptual diagram illustrating an optical communication network according to the exemplary embodiment of the present invention.

Referring to FIG. 6, the OLT, which is a device located in the CO, may include a light source 600, a channel selection unit 610, and a transmitted wavelength multiplexing unit 620. Although not illustrated in FIG. 6, in a case where the OLT serves as an optical receiving unit, the OLT may further include an optical receiver, a received wavelength demultiplexing unit, a wavelength band separation/combination unit, a signal processing module and the like.

Further, the OLT may further include a light source driver for controlling the light source 600. The light source driver may control the light source 600 by controlling a current flowing in the light source.

The optical transmitter may add a modulation signal of a low frequency band, which has the purpose of the control and monitoring, to a downlink WDM optical signal modulated at a high speed, and generate a low-speed downlink WDM optical signal for data transmission. Here, a frequency of the downlink WDM optical signal is a low frequency of about 1 kHz.

The optical transmitter may further include the light source 600 for generating a high speed downlink WDM optical signal, and a low frequency signal generator for generating a low frequency band modulation signal. The light source 600 may include a wavelength tunable laser light source, a wavelength-fixed laser light source, a broadband incoherent light source, an external injected wavelength fixed broadband light source. The light transmitter may be implemented in order to transmit an optical signal through a plurality of channels.

The channel selection unit 610 may determine a channel through which the low frequency signal according to the exemplary embodiment of the present invention will be transmitted. The low frequency signal may be generated in a corresponding channel by setting only the low frequency enabling module of the optical transmitter to be in the enable mode for a $k^{th}$ channel (k=1, 2, . . . , and n) desired to control. For the channel not-performing the control, all of the optical transmitter low frequency driving modules are set to be in a disable mode, so that the low frequency signal for the control may not be generated.

The low frequency signal is added only in the channel selected by the channel selection unit 610, so that a low frequency band control/monitoring signal may be added only to an optical signal of a specific wavelength desired to be detected in a wavelength multiplexed WDM optical signal. In the wavelength tunable optical receiver to be described below, an enable condition of the wavelength tunable optical filter, through which the optical signal including the added control/monitoring signal is selected through an electrical filter of a low frequency band may be found. The obtained enable condition of the wavelength tunable optical filer of the wavelength tunable optical receiver, a current value of a low frequency electrical signal, and the like may be stored in the lookup table.

The transmitted wavelength multiplexing unit 620 may wavelength-multiplex a downlink WDM optical signal generated in the optical transmitter. Here, the transmitted wavelength multiplexing unit 620 may include an AWG and a thin film filter as a wavelength multiplexing/demultiplexing device, which is implemented so that a center wavelength of the channel or a frequency interval has a predetermined value.

Further, the optical receiving unit of the ONU may include a light receiving unit 640, a distributor 650, a valid signal determination unit 660, a filter setting unit 670, a storage unit 680, a wavelength tunable filter 690, and the like. The light receiving unit 640 may detect an intensity of the wavelength demultiplexed WDM optical signal passing through the wavelength tunable filter (690) into an electrical signal. The distributor 650 may be implemented so as to distribute the electrical signal converted by the light receiving unit 640.

The valid signal determination unit 660 may determine whether the received low frequency signal is a valid signal by measuring a current value of the low frequency signal received by the wavelength tunable optical receiver. For example, the valid signal determination unit 660 may determine whether the current value of the received low frequency signal is equal to or larger than a threshold value. When the current value of the low frequency signal is smaller than the threshold value, the valid signal determination unit 660 may determine that the received low frequency signal is not the valid signal, and control the wavelength tunable optical filter of the wavelength tunable optical receiver again. On the contrary, when the current value of the low frequency signal is equal to or larger than the threshold value, the valid signal determination unit 660 may determine that the received low frequency signal is the valid signal.

When the current value of the low frequency signal is equal to or larger than the threshold value, so that it is determined that the received low frequency signal is the valid signal, the filter setting unit 670 may set the wavelength tunable filter 690 for k channels, through which the low frequency signal is transmitted from the wavelength tunable optical receiver, based on the control/monitoring signal included in the low frequency signal. Further, the filter setting unit 670 may measure an enable condition of the wavelength tunable optical filter 690, in which the optical signal including the added control/monitoring signal is selected, and a PD value.

The storage unit 680 may store the enable condition of the wavelength tunable optical filter 690 of the wavelength tunable optical receiver, the current value of the low frequency electrical signal, and the like may be stored by using a method, such as a lookup table.

Although not illustrated in FIG. 6, the optical receiving unit of the OLT may be implemented so as to receive the optical signal transmitted in the Optical Network Unit (ONU). The received wavelength demultiplexing unit may demultiplex a received wavelength and transmit the demultiplexed optical signal to the optical receiving unit.

Similarly, the optical transmitter of the ONU may transmit an uplink WDM optical signal generated through the high speed modulation to a wavelength multiplexer of a remote node (RN). The wavelength multiplexer of the RN 700 may wavelength multiplex the uplink WDM optical signal and transmit the wavelength multiplexed uplink WDM optical signal to the wavelength band separation/combination unit. The wavelength band separation/combination unit may isolate the uplink WDM optical signal wavelength multiplexed by the wavelength multiplexer of the RN for each wavelength band, and transmit the isolated uplink WDM optical signal to the received wavelength demultiplexing unit of the OLT.

As described above, the embodiment has been disclosed in the drawings and the specification. The specific terms used herein are for purposes of illustration, and do not limit the scope of the present invention defined in the claims. Accordingly, those skilled in the art will appreciate that various modifications and another equivalent example may be made without departing from the scope and spirit of the present disclosure. Therefore, the sole technical protection scope of the present invention will be defined by the technical spirit of the accompanying claims.

What is claimed is:

1. A method of selecting a wavelength of a wavelength tunable optical receiver, comprising:
   receiving, by the wavelength tunable optical receiver, an optical signal from a wavelength tunable optical transmitter;
   filtering, by the wavelength tunable optical receiver, the optical signal through a low frequency band electrical signal filter, and obtaining a low frequency signal;
   determining, by the wavelength tunable optical receiver, whether the low frequency signal is a valid signal based on a current value of the low frequency signal; and
   when the low frequency signal is the valid signal, obtaining, by the wavelength tunable optical receiver, an enable condition of a wavelength tunable optical filter according to one or more channels selected by the low frequency signal,
   wherein the low frequency signal includes a control/monitoring signal.

2. The method of claim 1, further comprising:
   storing, by the wavelength tunable optical receiver, the enable condition of the wavelength tunable optical filter, and the current value of the low frequency signal.

3. The method of claim 2, wherein the wavelength tunable optical transmitter selects the one or more channels, though which the low frequency signal is to be transmitted, among all of the available channels, and transmits the low frequency signal through the one or more selected channels.

4. The method of claim 3, wherein the wavelength tunable optical transmitter sets the channel, through which the low frequency signal is to be transmitted, to an enable mode, and remaining channels except for the channel, through which the low frequency signal is to be transmitted, to a disable mode.

5. The method of claim 1, further wherein the determining whether the low frequency signal is the valid signal based on the current value of the low frequency signal further includes determining that the low frequency signal is the valid signal when the current value of the low frequency signal is larger than the threshold value.

6. A wavelength tunable optical receiver performing selection of a wavelength, comprising:
   an optical receiving unit configured to receive an optical signal from a wavelength tunable optical transmitter;
   a low frequency band electrical signal filter unit configured to filter the optical signal and obtain a low frequency signal;
   a valid signal determination unit configured to determine whether the low frequency signal is a valid signal based on a current value of the low frequency signal; and
   a filter setting unit configured to obtain an enable condition of a wavelength tunable optical filter, according to one or more channels selected by the low frequency signal, when the low frequency signal is the valid signal,
   wherein the low frequency signal includes a control/monitoring signal.

7. The wavelength tunable optical receiver of claim 6, further comprising:
   a memory configured to store the enable condition of the wavelength tunable optical filter, and the current value of the low frequency signal.

8. The wavelength tunable optical receiver of claim 7, wherein the wavelength tunable optical transmitter selects the one or more channels, though which the low frequency signal is to be transmitted, among all of the available channels, and transmits the low frequency signal through the one or more selected channels.

9. The wavelength tunable optical receiver of claim 8, wherein the wavelength tunable optical transmitter sets the channel, through which the low frequency signal is to be transmitted, to an enable mode, and remaining channels except for the channel, through which the low frequency signal is to be transmitted, to a disable mode.

10. The wavelength tunable optical receiver of claim 6, wherein the valid signal determination unit determines that the low frequency signal is the valid signal when the current value of the low frequency signal is larger than the threshold value.

* * * * *